(12) United States Patent
Goto et al.

(10) Patent No.: US 9,425,665 B2
(45) Date of Patent: Aug. 23, 2016

(54) STATOR AND ROTATING ELECTRIC MACHINE EQUIPPED WITH THIS STATOR

(75) Inventors: Kazuhiro Goto, Toyota (JP); Yosuke Kurono, Toyota (JP); Tatsuhiko Mizutani, Toyota (JP); Kazuya Onuki, Chita-gun (JP)

(73) Assignees: TOYOTA JIDOSHA KABUSHIKI KAISHA, Toyota-Shi (JP); DENSO CORPORATION, Kariya (JP)

( * ) Notice: Subject to any disclaimer, the term of this patent is extended or adjusted under 35 U.S.C. 154(b) by 101 days.

(21) Appl. No.: 13/996,584

(22) PCT Filed: Dec. 28, 2010

(86) PCT No.: PCT/JP2010/073693
§ 371 (c)(1),
(2), (4) Date: Jun. 21, 2013

(87) PCT Pub. No.: WO2012/090295
PCT Pub. Date: Jul. 5, 2012

(65) Prior Publication Data
US 2013/0264899 A1    Oct. 10, 2013

(51) Int. Cl.
*H02K 3/28* (2006.01)
*H02K 3/50* (2006.01)
*H02K 5/22* (2006.01)

(52) U.S. Cl.
CPC .. *H02K 3/28* (2013.01); *H02K 3/50* (2013.01); *H02K 5/225* (2013.01)

(58) Field of Classification Search
CPC ............ H02K 3/28; H02K 5/225; H02K 5/50

USPC ............................................................ 310/71
See application file for complete search history.

(56) References Cited

U.S. PATENT DOCUMENTS

| | | | |
|---|---|---|---|
| 5,682,070 A * | 10/1997 | Adachi et al. .................... | 310/71 |
| 7,476,995 B2 * | 1/2009 | Uchiyama .............. | H02K 3/505 |
| | | | 310/179 |
| 2003/0173842 A1 * | 9/2003 | Kobayashi et al. ............. | 310/71 |
| 2004/0232780 A1 | 11/2004 | Oohashi | |
| 2005/0001494 A1 | 1/2005 | Kuribayashi et al. | |
| 2005/0253466 A1 | 11/2005 | Seguchi et al. | |
| 2010/0060100 A1 | 3/2010 | Urano et al. | |
| 2010/0141064 A1 * | 6/2010 | Dumpert et al. ................ | 310/71 |

FOREIGN PATENT DOCUMENTS

| CN | 1106171 A | 8/1995 |
|---|---|---|
| CN | 101689778 A | 3/2010 |

(Continued)

*Primary Examiner* — Terrance Kenerly
(74) *Attorney, Agent, or Firm* — Kenyon & Kenyon LLP

(57) ABSTRACT

In a stator and a rotating electric machine equipped with this stator, the insulation properties of a coil are ensured by suppressing lead wire stress generated during a stator assembly process. The stator has a stator core, a coil wound around the stator core, lead wires led out from the coil, and power lines provided between the lead wires and a connection terminal of an external circuit. The lead wires and the power lines are electrically connected with each other through an elastically deformable elastic bus bar. Even if a shift occurs in the relative position between the coil and the connection terminal during the assembly process of the stator, this configuration allows the elastic bus bar to absorb the shift and makes it possible to suppress the stress generated on the lead wires.

5 Claims, 4 Drawing Sheets

(56) References Cited

FOREIGN PATENT DOCUMENTS

| | | |
|---|---|---|
| DE | 102004007395 A1 | 1/2005 |
| DE | 102004031420 A1 | 2/2005 |
| DE | 102005022280 A1 | 1/2006 |
| EP | 0500954 A1 | 9/1992 |
| EP | 0647984 A2 | 4/1995 |
| JP | H05308742 A | 11/1993 |
| JP | 7-111749 A | 4/1995 |
| JP | 9-247881 A | 9/1997 |
| JP | 2002-112490 A | 4/2002 |
| JP | 2002-247811 A | 8/2002 |
| JP | 2004-350381 A | 12/2004 |

\* cited by examiner

STATOR AND ROTATING ELECTRIC MACHINE EQUIPPED WITH THIS STATOR This is a 371 national phase application of PCT/JP2010/073693 filed 28 Dec. 2010, the contents of which are incorporated herein by reference.

TECHNICAL FIELD

The present invention relates to a stator and a rotating electric machine equipped with this stator, and more specifically to improvement of a connecting structure between a coil and terminals of a stator.

BACKGROUND ART

A rotating electric machine has a rotor and a stator disposed around the rotor. The stator has a coil, and a current flowing through this coil generates a rotating magnetic field. Electromagnetic effects acting between this rotating magnetic field and the rotor cause the rotor to rotate.

Patent Literature 1 below discloses a stator having a stator core, a coil wound around this stator core, and a lead line extending from the coil. In such a stator, the coil is impregnated with varnish, such as high strength epoxy resin, to enhance mechanical strength of the coil and ensure insulation.

Patent Literature 2 below discloses a stator core, a coil wound around this stator core, a lead line of the coil, and a connection terminal connecting between the lead line and an external circuit. A curved bent portion is formed on the lead line. This bent portion absorbs stress caused on a lead wire due to changes in relative positions of the stator and the connection terminal, and prevents the lead wire from being damaged.

CITATION LIST

Patent Literature

[Patent Literature 1] JP 2004-350381 A
[Patent Literature 2] JP 2002-247811 A

SUMMARY OF INVENTION

Technical Problem

Patent Literature 1 and Patent Literature 2 above disclose an example of a stator in which a lead line of a coil is connected to a connection terminal of an external terminal via a power line which is a conductor such as copper. In order to assemble such a stator, before relative positions of the coil and the connection terminal are determined, one end of the power line is fixed to a tip of the lead line of the coil by welding. Then, another end of the power line is aligned to the connection terminal whose position has been determined, and fixed via a bolt, for example. Because the lead line is tensioned or compressed during this alignment of the power line upon fixation, stress is caused on this lead line. Due to stress caused on the lead line, coating of the coil, such as thermoplastic resin, which is affixed to varnish may be peeled from the coil disposed at the base end of the lead line, and insulation failure may be caused.

The object of the present invention is to provide a stator that reduces stress caused on the lead line of the coil during the stator assembly process to thereby ensure insulation of the coil, and provide a rotating electric machine having this stator.

Solution to Problem

A feature of the present invention is that, in a stator which has a stator core, a coil wound around the stator core, a lead line extending from the coil, and a power line disposed between the lead line and a connection terminal of an external circuit, the lead line and the power line are electrically connected via an elastically deformable elastic bus bar.

Further, a coil is a three-phase AC coil and is able to have a module member in which elastic bus bars of respective phases are integrated using an insulating member.

It is also preferable that the elastic bus bar is formed by bending a plate-like conductor.

It is further preferable that the module member includes a terminal bus bar which connects between terminals arranged on both sides of coil ends along the radial direction.

It is still further preferable that a rotating electric machine has the above-described stator.

Advantageous Effects of Invention

With a stator of the present invention and a rotating electric machine having this stator, it is possible to reduce stress caused on a lead line of a coil during the stator assembly process and ensure insulation of the coil.

DESCRIPTION OF EMBODIMENTS

Figure 1:
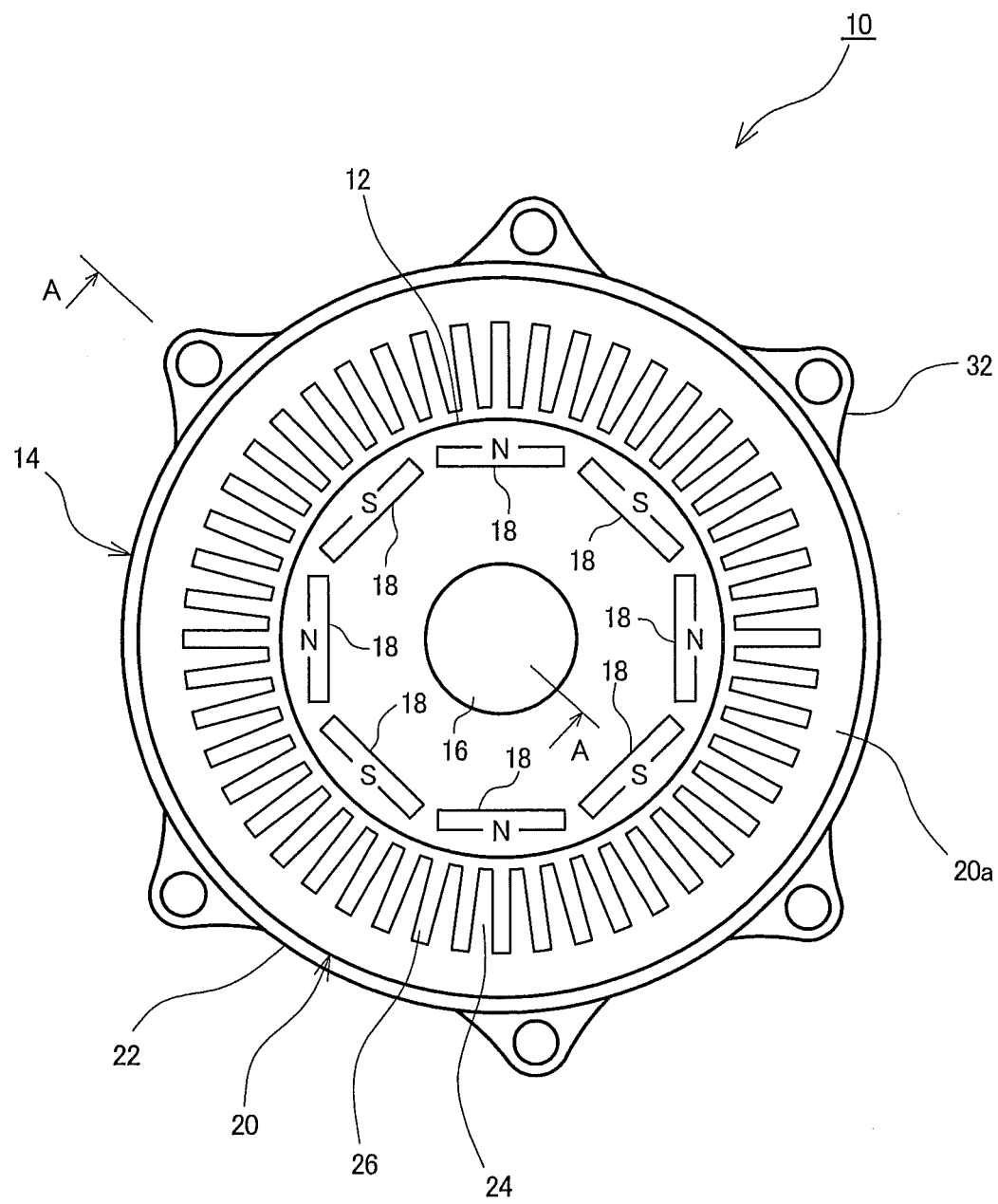
FIG. 1 shows a configuration of a rotating electric machine according to the present embodiment.
Figure 2:
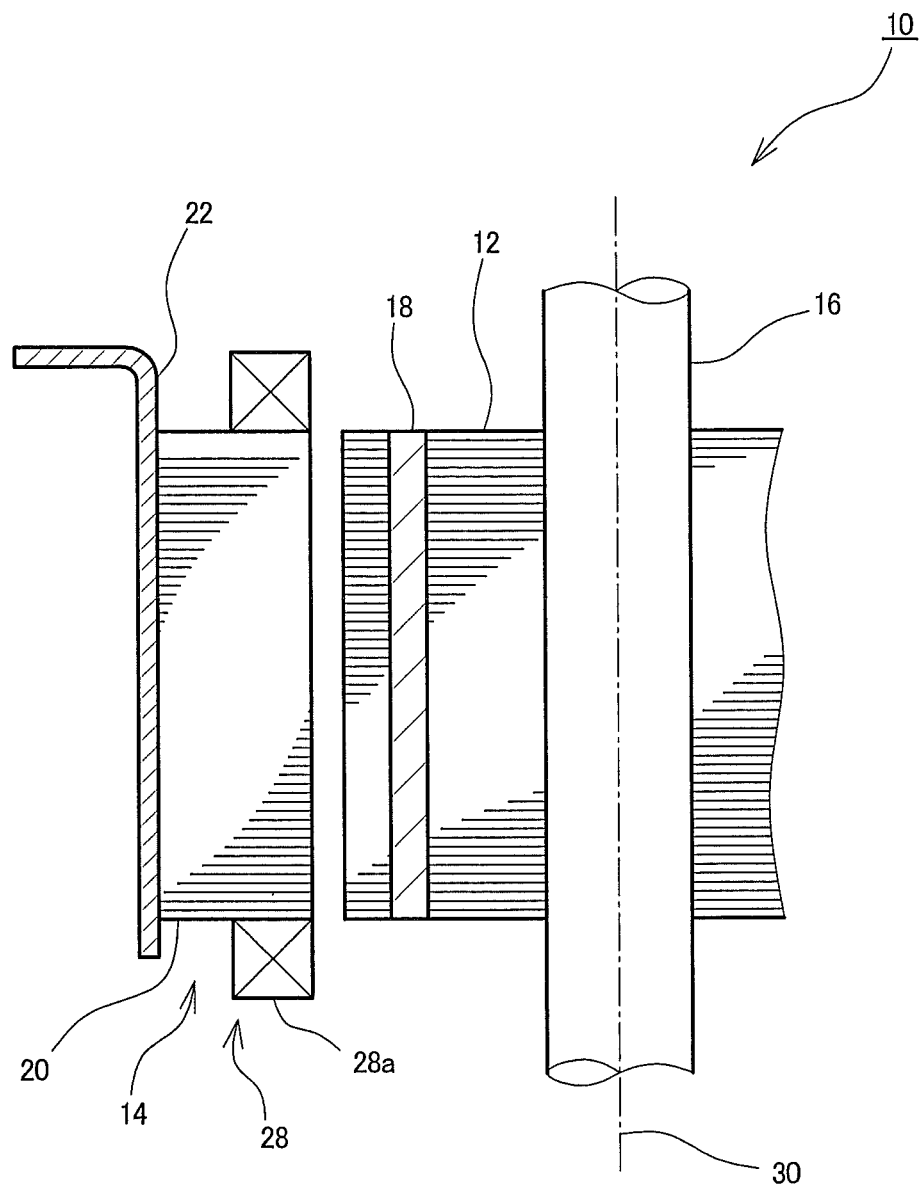
FIG. 2 shows a cross-section of the rotating electric machine taken along the line A-A of FIG. 1.

An embodiment of a stator of the present invention and a rotating electric machine having this stator will be described hereinafter with reference to FIGS. 1 and 2. FIG. 1 shows a configuration of a rotating electric machine according to the present embodiment, while FIG. 2 shows a cross-section of a stator taken along the line A-A of FIG. 1.

A rotating electric machine 10 of the present embodiment is a three-phase AC rotating electric machine and is used as a motor for a vehicle, for example. The rotating electric machine 10 has a rotor 12, a stator 14, and a case for containing them (not shown). The stator 14 is disposed along the inner circumference of the case, and the rotor 12 is disposed inside this inner circumference of the stator 14 in a rotatable manner.

The rotor 12 is a cylindrical magnetic body that is concentric with a rotation shaft 16 and is formed by laminating, for example, electromagnetic steel plates along the axis direction. As shown in FIG. 1, in the rotor 12, eight permanent magnets 18 are arranged along the circumferential direction. The number of the permanent magnets 18 is just one example. In the present embodiment, the permanent magnets 18 are embedded in holes formed in the rotor 12 so as to extend along the axis direction. However, this is not limiting, and the permanent magnets 18 may be disposed along the outer circumference of the rotor 12. A rotation shaft 16 is rotatably supported by a bearing (not shown) disposed in the case. In addition, although, in the present embodiment, a case where the rotor 12 is formed by laminating the electromagnetic steel plates has been described, this configuration is not limiting, and the rotor 12 may be formed of dust core.

The stator 14 is disposed around the rotor 12 with a slight gap from the rotor 12. The stator 14 has a hollow cylindrical stator core 20 and a cylindrical body 22 surrounding the stator core 20 and fixing the stator core 20.

The stator core 20 is a magnetic body and is formed by laminating, for example, electromagnetic steel plates along the axis direction. More specifically, the stator core 20 is formed by pressing and punching thin plate-like electromagnet steel plates, laminating a predetermined number of punched electromagnetic steel plates along the axis direction, and applying, for example, pressing and compacting processing to a plurality of laminated electromagnetic steel plates to thereby integrate the plates. Although, in the present embodiment, a case where the stator core 20 is formed by laminating the electromagnetic steel plates has been described, this configuration is not limiting, and the stator core 20 may be formed of a dust core.

The stator core 20 has a ring-shaped yoke 20a and teeth 24 which protrude from the inner circumference of this yoke 20 toward the inside in the radial direction and are arranged along the circumferential direction with a predetermined interval in between. A conductor such as copper extends through a slot 26 which is a groove-like space between the teeth 24. By extending this conductor through the slot 26 and winding it around the teeth 24, a coil 28 (shown in FIG. 2) is formed. In order to provide insulation, the surface of the conductor constituting the coil 28 is coated with thermoplastic resin such as polyphenylene sulfide resin (PPS).

The coil 28 has a portion referred to as a coil end 28a which serves to bridge the conductor from one slot 26 to another slot 26. The coil end 28a is positioned so as to protrude from the end portion of the stator core 20 along the direction of the axis 30, as shown in FIG. 2. By impregnating and filling the coil 28 with varnish from the coil end 28a side to the inside of the coil 28, mechanical strength and insulation of the coil 28 are ensured.

A cylindrical body 22 has an approximate cylindrical shape and is formed such that the inner diameter of this shape is smaller than the outer diameter of the stator core 2, in consideration of interference. The cylindrical body 22 fastens and fixes the stator core 22 by shrink fitting or press fitting. As shown in FIG. 2, a flange portion 32 extending to the outside along the radial direction is formed on the end portion along the direction of the axis 30. This flange portion 32 is fixed to the case via a fastening member such as a bolt.

In the rotating electric machine configured in such a manner, by turning on the coil 28, a rotating magnetic field is generated in the stator 14, and a force to be absorbed by this rotating magnetic field is generated in the rotor 12 having the permanent magnets 18, thereby causing the rotor 12 to rotate.

Figure 3:
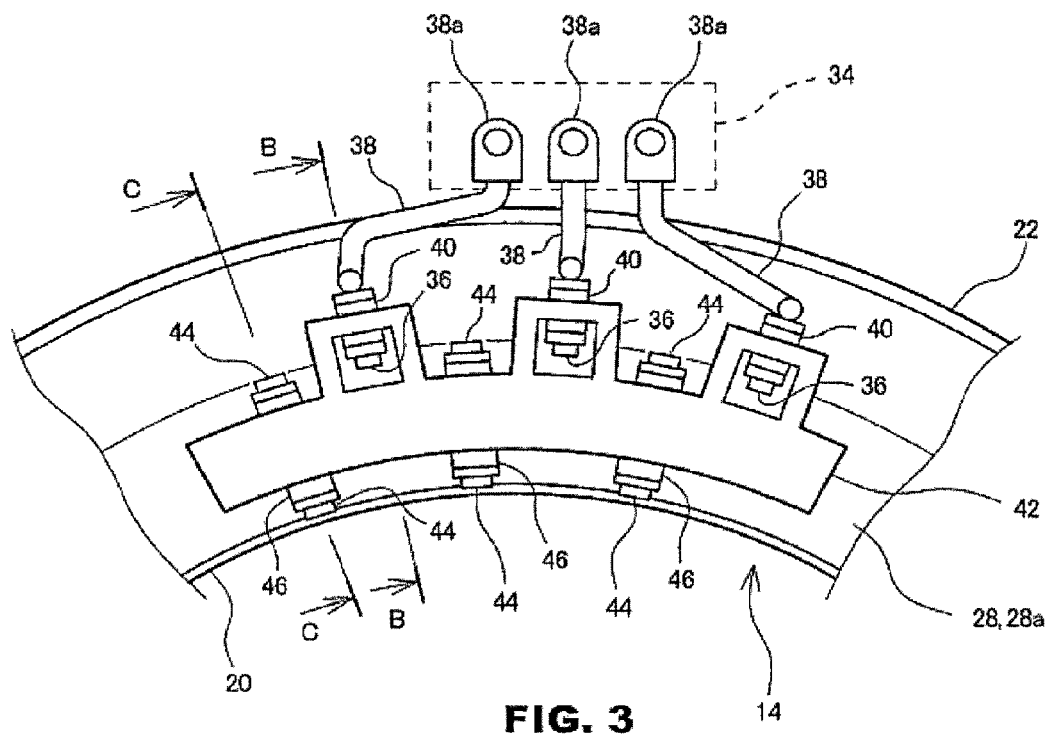
FIG. 3 shows a partial detailed view of an end portion of a stator from the axis direction.
Figure 4:
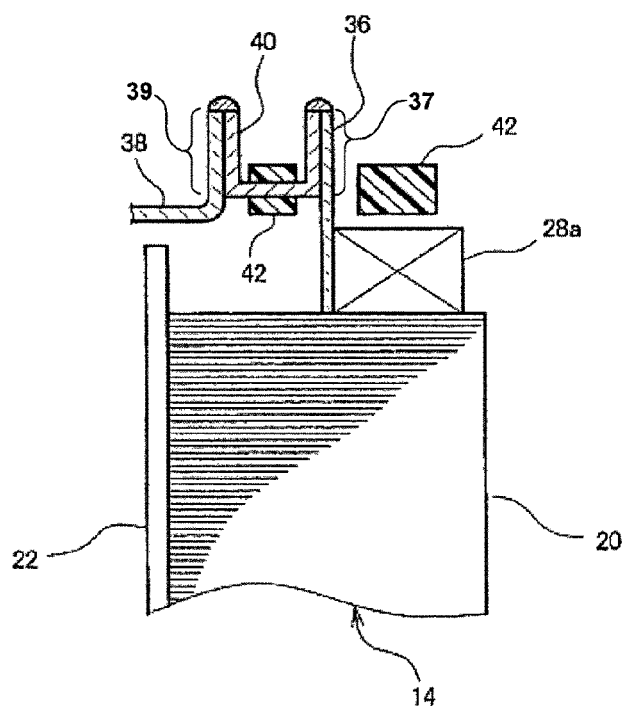
FIG. 4 shows a cross-section of the stator taken along the line B-B of FIG. 3.
Figure 5:
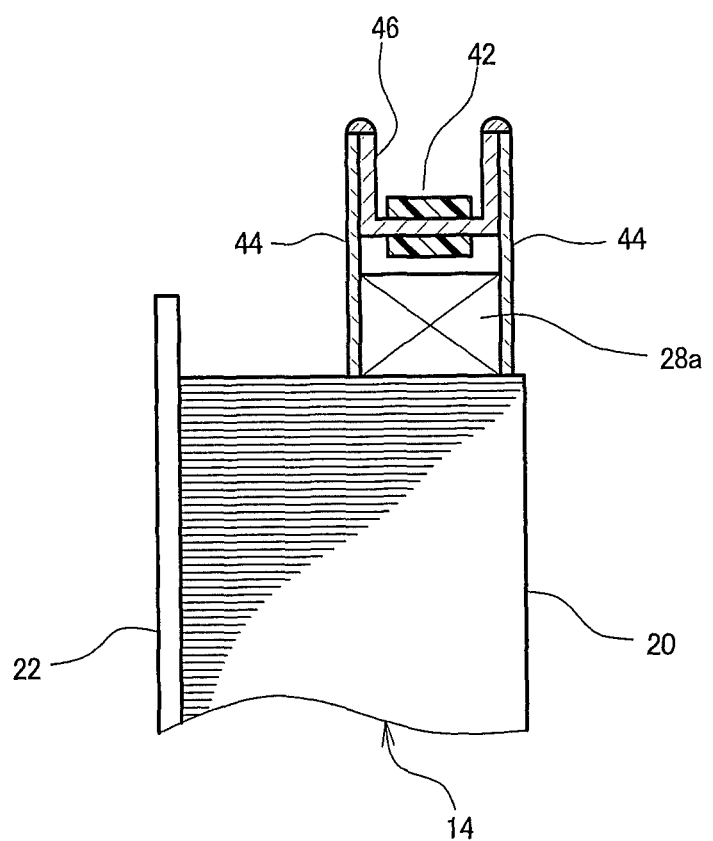
FIG. 5 shows a cross-section of the stator taken along the line C-C of FIG. 3.

Next, a connecting structure between the coil 28 of the stator 14 and a connection terminal 34 will be described with reference to FIGS. 3 to 5. FIG. 3 shows a partial detailed view of the end portion of the stator 14 from the direction of the axis 30. FIG. 4 shows a cross-section of the stator 14 taken along the line B-B of FIG. 3, while FIG. 5 shows a cross-section of the stator 14 taken along the line C-C of FIG. 3.

The stator 14 has the connection terminal 34 for an external circuit, a lead line 36 extending from the coil 28, and a power line 38 disposed between the connection terminal 34 and the lead line 36. The lead line 36 and the power line 38 are electrically connected via an elastic bus bar 40 which is elastically deformable. The lead line 36, the power line 38, and the elastic bus bar 40 are all conductors.

The connection terminal 34 is a terminal for connecting between an external circuit connected to a power supply such as a battery and the coil 28. The connection terminal 34 is provided on the case. The connection terminal 34 consists of three terminals: U-phase, V-phase, and W-phase terminals.

As shown in FIG. 4, the lead line 36 is extended from the coil end 28a located outside along the radial direction. The lead line 36 is formed such that its base end is affixed to the coil end 28a with varnish and its end segment 37 extends outside along the direction of the axis 30. In order to correspond to the above-described connection terminals 34, the lead line 36 includes three conductors: U-phase, V-phase, and W-phase conductors.

As shown in FIG. 3, the power line 38 has mounting brackets 38a which can be fixed to the connection terminals 34 via a securing member such as a bolt. In order to correspond to the above-described connection terminals 34, the power line 38 also includes three conductors: U-phase, V-phase, and W-phase conductors.

The elastic bus bar 40 is formed by bending a conductor in an elastically deformable manner. More specifically, as shown in FIG. 4, the elastic bus bar 40 is formed to have a U-shaped cross-section. One end of the elastic bus bar 40 is connected to the end segment 37 of the lead line 36, for example, by welding. Meanwhile, the other end of the elastic bus bar 40 is connected to the end segment 39 of the power line 38, for example, by welding. The elastic bus bar 40 also includes three conductors: U-phase, V-phase, and W-phase conductors.

By causing the elastically deformable elastic bus bar 40 to electrically connect between the lead line 36 and the power line 38 in this way, it is possible to reduce stress caused on the lead line 36 during the assembly process of the stator 14 and ensure insulation of the coil 28.

More specifically, in order to assemble the stator 14, before the relative positions between the coil 28 and the connection terminal 34 are determined, the lead line 36, the elastic bus bar 40, and the power line 38 are connected by welding, respectively. Then, after the stator 14 is fixed to the case, and the relative positions of the stator 14 and the connection terminal 34 are determined, the mounting bracket 38a of the power line 38 is fixed to the connection terminal 34 via a bolt, for example. This alignment between the mounting bracket 38a of the power line 38 and the connection terminal 34 tensions or compresses the power line 38 upon fixation and causes stress on this power line 38. Because, in the stator 14 according to the present embodiment, this stress on the power line 38 is absorbed by elastic deformation of the elastic bus bar 40, stress caused on the lead line 36 is reduced. Accordingly, unlike the conventional art, coating of the base end of the lead line 36 is prevented from being peeled from the conductor serving as the body of the lead line 36, and as a result, insulation of the coil 28 can be ensured.

Further, the stator 14 according to the present embodiment has a feature of having a module member 42 in which the elastic bus bars 40 of the respective phases are integrated using an insulating member. The insulating member is thermoplastic resin such as aromatic nylon (PA6T), and the module member 42 is formed by resin molding.

By integrating three elastic bus bars 40 using the insulating member in this manner, it becomes possible to further reduce stress caused on the lead line 36. In other words, stress caused on at least one power line 38 during the assembly process of the stator 14 is absorbed by the elastic bus bar 40 connected to that power line 38 and reduced. Then, the stress that has not been absorbed is transmitted from that elastic bus bar 40 to other elastic bus bars 40 via the insulating member and absorbed there. In other words, the module member 42 can distribute the stress caused on the power line 38 and allow it to be absorbed by the three elastic bus bars 40. Further, because the module member 42 includes thermoplastic resin, it is also possible for this resin to absorb the stress on the power line 38.

Further, the module member 42 includes a terminal bus bar 46 connecting between terminals 44 arranged on both sides of the coil end 28a along the radial direction. The terminal 44 and the terminal bus bar 46 are both conductors.

As shown in FIG. 5, the terminals 44 extend from outside and inside of the coil end 28 along the radial direction, respectively. The base ends of the terminals 44 are affixed to the coil end 28a with varnish, and the tips of the terminals 44 are formed so as to extend to the outside along the direction of the axis 30. The terminal 44 includes three conductors: U-phase, V-phase, and W-phase conductors.

The terminal bus bar 46 is formed by bending a conductor in an elastically deformable manner, like the elastic bus bars 40. More specifically, as shown in FIG. 5, the terminal bus bar 46 is formed to have a U-shaped cross-section. One end of the terminal bus bar 46 is connected to the tip of the terminal 44 located outside along the radial direction by, for example, welding. Meanwhile, the other end of the terminal bus bar 46 is connected to the tip of the terminal 44 located inside along the radial direction by, for example, welding. The terminal bus bar 46 also includes three conductors: U-phase, V-phase, and W-phase conductors.

The module member 42 is formed by integrating, that is, resin molding, the terminal bus bars 46 of the respective phases using the insulating member. With such a configuration, it is possible to further reduce stress caused on the lead line 36. More specifically, during the assembly processing of the stator 14, stress on a power line 38 is transmitted from an elastic bus bar 40 connected to that power line 38 to the other elastic bus bars 40 via the insulating member, and also to the terminal bus bars 46 and absorbed there. In other words, it is possible for the module member 42 to distribute stress caused on the power line 38 to as many elastic bus bars 40 and 46 as possible and allow the stress to be absorbed there, thereby further reducing the stress caused on the lead line 36. Further, with this configuration, it is also possible to distribute vibrations generated during operation of the rotating electric machine 10 to the respective bus bars 40 and 46 and absorb it there. As a result, stress caused on the lead line 36 can be reduced.

Further, by adopting such a module member 42, alignment between the lead line 36 extending from the coil end 28a and the terminal 44, more particularly, alignment between the tips of them, can be facilitated, and the steps of the assembly processing of the stator 14 can be reduced.

Industrial Applicability

Although, in the present embodiment, it has been described that the numbers of the connection terminals 34, the lead lines 36, the power lines 38, the elastic bus bars 40, the terminals 44, and the terminal bus bars 46 correspond to the number of U-phase, V-phase, and W-phase, respectively, the present invention is not limited to this configuration, and it may further include a neutral point terminal or conductor.

Although, in the present embodiment, it has been described that the elastic bus bar 40 is formed to have a U-shaped cross-section, the present invention is not limited to this configuration. The elastic bus bar 40 may also be formed to have other shapes, such as an S-shaped cross-section, as long as it is an elastically deformable shape.

Although, in the present embodiment, it has been described that the terminal bus bar 46 is formed to have a U-shaped cross-section, the present invention is not limited to this configuration. The terminal bus bar 40 may also be formed to have other shapes as long as it is an elastically deformable shape.

Further, although, in the present embodiment, it has been described that the terminal bus bar 46 connects between the terminals 44 facing along the radial direction as shown in FIG. 3, the present invention is not limited to this configuration. The terminal bus bar 46 may also connect between two terminals 44 that do not face along the radial direction, that is, two terminals 44 that are arranged so as to be shifted along the circumferential direction. In this case, the terminal bus bar 46 is provided so as to extend along the circumferential direction in the insulating member of the module member 42.

Reference Signs List

10 Rotating electric machine, 14 stator, 20 stator core, 28 coil, 28a coil end, 34 connection terminal, 36 lead line, 38 power line, 40 elastic bus bar, 42 module member, 44 terminal, 46 terminal bus bar.

The invention claimed is:

1. A stator comprising:
a stator core;
a coil wound around the stator core and having a coil end;
a lead line having one end affixed to a side of the coil end and an end segment extending away from the coil;
an elastically deformable elastic bus bar connected to the end segment of the lead line and disposed away from the coil in a direction in which the end segment of the lead line extends; and
a power line disposed between the elastic bus bar and a connection terminal of an external circuit such that the power line includes another end segment coupled to said elastic bus bar, wherein
the coil is a three-phase AC coil;
the lead line, the power line, and the elastic bus bar are provided for each phase;
the power line is disposed away from the coil end in the direction in which the lead line extends;
the lead line and the power line are electrically connected via the elastic bus bar for each phase;
the elastic bus bars of the respective phases are integrated by a module member using an insulating member;
the module member is formed by resin molding and is disposed with a space from the stator core; and
the another end segment of the power line extends in a same direction away from the coil as the end segment of the lead line and at a same distance away from the coil as the end segment of the lead line.

2. The stator according to claim 1, wherein the elastic bus bar is formed by bending a plate-like conductor.

3. The stator according to claim 1, wherein the module member includes an elastically deformable terminal bus bar which connects between terminals arranged on both sides of the coil end along the radial direction.

4. A rotating electric machine comprising the stator according to claim 1.

5. The stator according to claim 1, wherein the elastically deformable elastic bus bar has a U-shaped cross-section.

* * * * *